United States Patent
Yoshii et al.

(10) Patent No.: US 8,649,913 B2
(45) Date of Patent: Feb. 11, 2014

(54) ELECTRICAL EQUIPMENT MANAGEMENT SYSTEM

(75) Inventors: Katsuji Yoshii, Tokyo-to (JP); Shigeo Tera, Oizumi-machi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 159 days.

(21) Appl. No.: 12/894,931

(22) Filed: Sep. 30, 2010

(65) Prior Publication Data

US 2011/0077791 A1 Mar. 31, 2011

(30) Foreign Application Priority Data

Sep. 30, 2009 (JP) ................................. 2009-227829

(51) Int. Cl.
| | | |
|---|---|---|
| G05B 13/00 | (2006.01) | |
| G05B 15/00 | (2006.01) | |
| G05D 23/00 | (2006.01) | |
| G06F 19/00 | (2011.01) | |
| G01R 21/06 | (2006.01) | |
| G01R 11/56 | (2006.01) | |
| G01R 21/133 | (2006.01) | |
| G06F 17/00 | (2006.01) | |
| H02J 3/14 | (2006.01) | |

(52) U.S. Cl.
USPC ............. 700/296; 700/278; 702/61; 705/412; 307/39; 340/870.17

(58) Field of Classification Search
USPC ................. 700/275–278, 286, 291, 295–298; 705/412; 307/11, 38, 39; 340/870.01–870.03, 870.11, 870.16, 340/870.17; 702/57, 60–62
See application file for complete search history.

(56) References Cited

U.S. PATENT DOCUMENTS

| | | | | |
|---|---|---|---|---|
| 4,568,934 A | * | 2/1986 | Allgood | 340/870.02 |
| 5,543,667 A | * | 8/1996 | Shavit et al. | 307/39 |
| 5,838,258 A | * | 11/1998 | Saar | 340/870.11 |
| 5,949,232 A | * | 9/1999 | Parlante | 324/142 |
| 6,021,401 A | * | 2/2000 | Oravetz et al. | 705/412 |

(Continued)

FOREIGN PATENT DOCUMENTS

| | | |
|---|---|---|
| JP | 63-080717 A | 4/1988 |
| JP | 2007-033305 A | 2/2007 |
| JP | 2007-113913 A | 5/2007 |

OTHER PUBLICATIONS

Japanese Office Action dated Jul. 2, 2013, issued in corresponding Japanese Patent Application No. 2009-227829.

*Primary Examiner* — Crystal J Barnes-Bullock
(74) *Attorney, Agent, or Firm* — Westerman, Hattori, Daniels & Adrian, LLP

(57) ABSTRACT

An electrical equipment management system includes: a total electrical energy information acquiring unit disposed in a building having a plurality of sections, the unit to acquire total electrical energy information indicative of total electrical energy consumed in a whole of the sections; an individual electrical energy acquiring unit to acquire individual electrical energy information indicative of electrical energy consumption in each section depending on the total electrical energy; and a control information output unit to output control information for controlling operation of electrical equipment disposed in the sections so that electrical energy consumption thereof does not exceed an upper limit, in accordance with difference between the individual electrical energy information and upper limit information indicative of an upper limit of electrical energy consumption for each predetermined period for each of the sections as well as remaining period information indicative of a remaining period before a lapse of the predetermined period.

5 Claims, 8 Drawing Sheets

(56) References Cited

U.S. PATENT DOCUMENTS

| | | | |
|---|---|---|---|
| 6,161,100 A * | 12/2000 | Saar | 705/412 |
| 6,842,668 B2 * | 1/2005 | Carson et al. | 700/286 |
| 7,309,979 B2 * | 12/2007 | Angerame et al. | 324/103 R |
| 7,412,304 B2 * | 8/2008 | Uenou | 700/295 |
| 7,478,070 B2 * | 1/2009 | Fukui et al. | 705/412 |
| 7,747,357 B2 * | 6/2010 | Murdoch | 700/295 |
| 7,809,472 B1 * | 10/2010 | Silva et al. | 700/277 |
| 8,078,330 B2 * | 12/2011 | Brickfield et al. | 700/291 |
| 8,200,370 B2 * | 6/2012 | Paik | 700/291 |
| 2012/0091213 A1 * | 4/2012 | Altonen et al. | 236/51 |
| 2012/0095601 A1 * | 4/2012 | Abraham et al. | 700/278 |

* cited by examiner

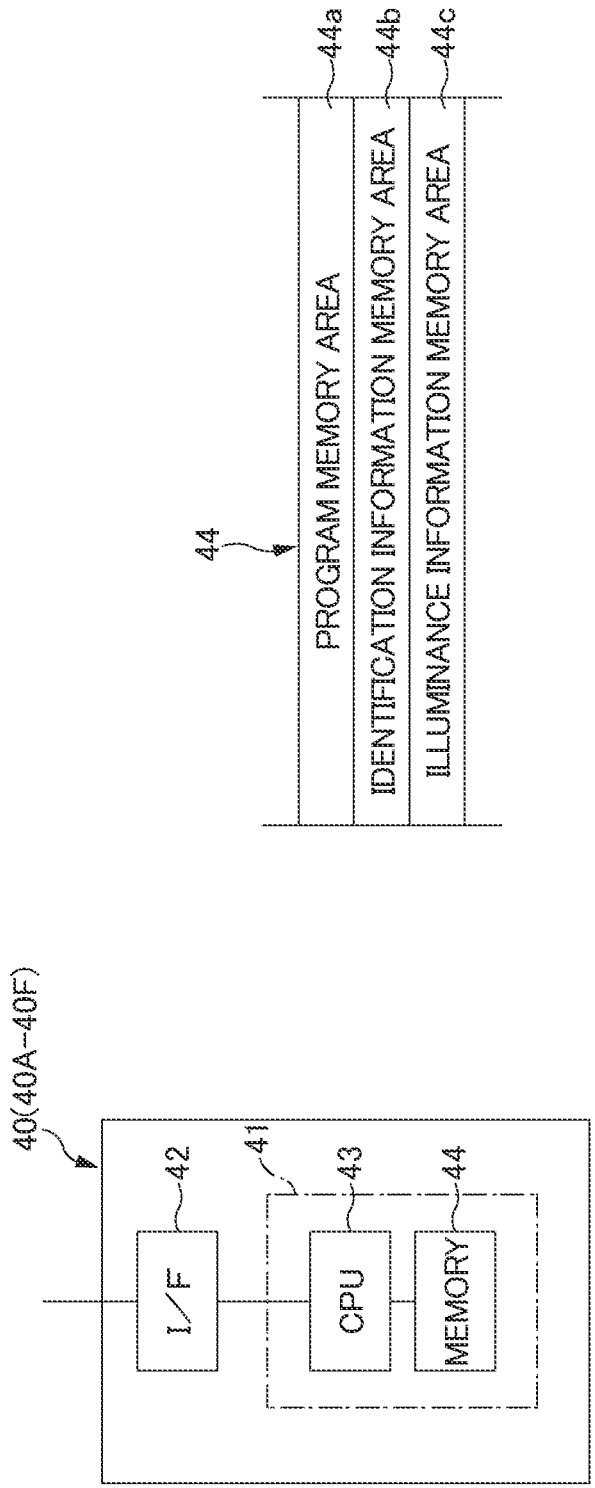

ELECTRICAL EQUIPMENT MANAGEMENT SYSTEM

CROSS-REFERENCE TO RELATED APPLICATION

This application claims the benefit of priority to Japanese Patent Application No. 2009-227829, filed Sep. 30, 2009, of which full contents are incorporated herein by reference.

BACKGROUND OF THE INVENTION

1. Field of the Invention

The present invention relates to an electrical equipment management system.

2. Description of the Related Art

A system that carries out centralized management over the operational status of air conditioners disposed in a plurality of buildings from a remote site is known (see, e.g., Japanese Laid-Open Patent Publication No. 2007-113913). This system optimizes the operational status of air conditioners in each building.

Generally, a commercial building is divided into a plurality of sections and each section is occupied by a tenant. Following amendment of the Act on the Rational Use of Energy, energy conservation, i.e., reduction of electrical energy consumption on a corporation basis has become mandatory. As a result, cases of applying the Act on the Rational Use of Energy to individual tenants in a building, which have conventionally been exempted from the Act on the Rational Use of Energy, are increasing. Applying the Act on the Rational Use of Energy to individual tenants makes it necessary for each tenant to reduce the amount of electrical energy consumed, which leads to a demand for management/control of the amount of electrical energy consumption in line with the circumstances of each tenant. In recent years, a rise in an energy conservation orientation has lead to a practice such that loading apparatuses, such as air conditioners and lightings, are controlled so that electrical energy consumption is kept within a range, for example, a preset monthly target of electrical energy consumption.

However, air conditioners had conventionally been managed by each building, where tenants could not set individual targets or individually collect data on electrical energy consumption.

The present invention has been conceived in view of the above circumstances, and it is therefore an object of the present invention to manage electrical energy consumed at each section so that the amount of electrical energy consumed does not exceed its upper limit.

SUMMARY OF THE INVENTION

An electrical equipment management system according to an aspect of the present invention, comprises: a total electrical energy information acquiring unit disposed in a building having a plurality of sections, the total electrical energy information acquiring unit configured to acquire total electrical energy information indicative of a total electrical energy consumed in a whole of the plurality of sections; an individual electrical energy acquiring unit configured to acquire individual electrical energy information indicative of electrical energy consumption in each section depending on the total electrical energy; and a control information output unit configured to output control information for controlling operation of electrical equipment disposed in the section so that electrical energy consumption thereof does not exceed an upper limit, in accordance with a difference between the individual electrical energy information and an upper limit information indicative of an upper limit of electrical energy consumption for each predetermined period for each of the sections as well as a remaining period information indicative of a remaining period before a lapse of the predetermined period.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4A is a block diagram illustrating a configuration of a control system provided to a fluorescent lamp unit in the electrical equipment management system of the present embodiment;

FIG. 4B is an explanatory diagram of memory areas provided to a memory in the control system;

DETAILED DESCRIPTION OF THE INVENTION

At least the following details will become apparent from descriptions of this specification and of the accompanying drawings

One Embodiment

<Overall Configuration of System>

Figure 1:
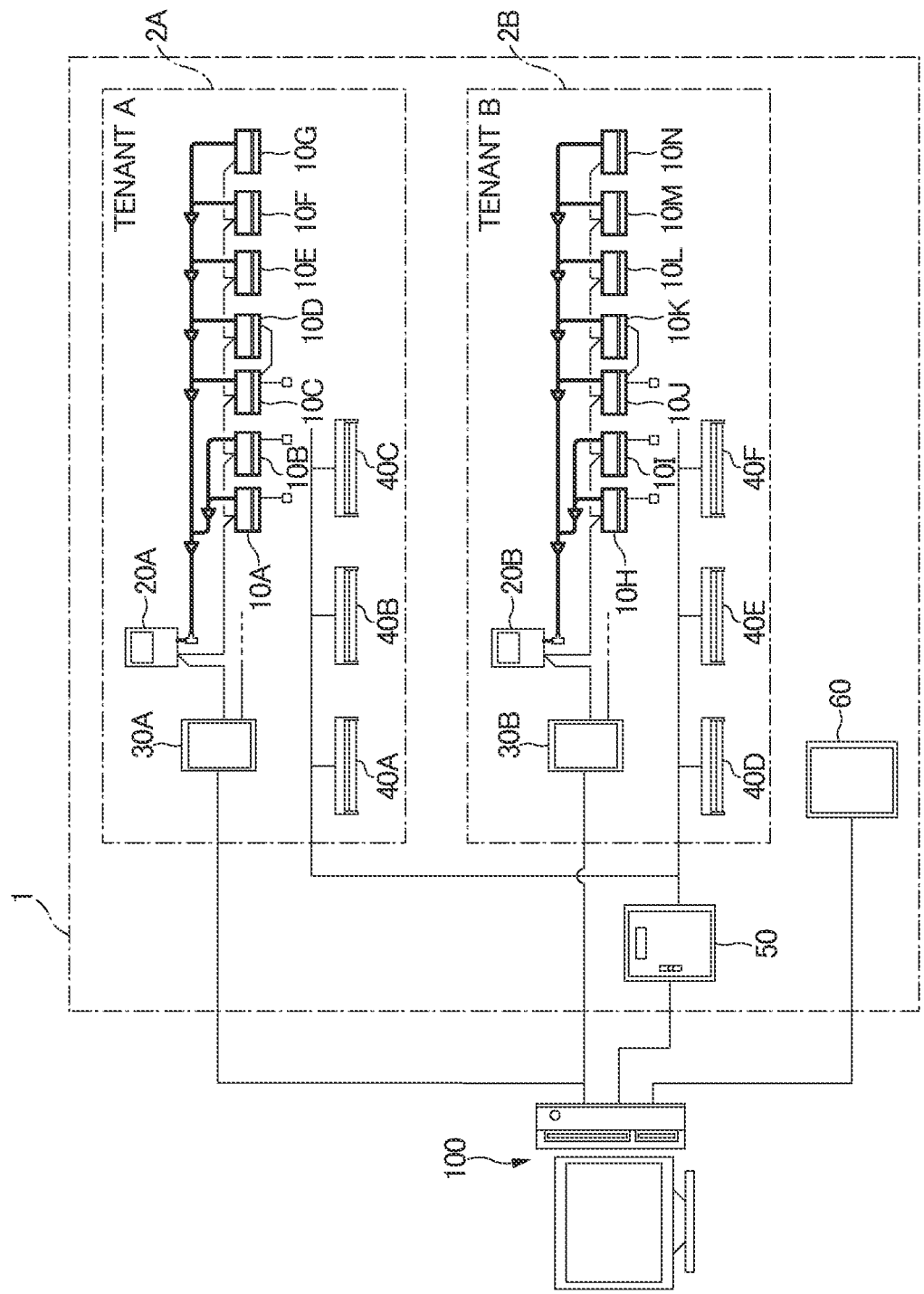
FIG. 1 is an explanatory diagram of a configuration of an electrical equipment management system according to the present embodiment.

An electrical equipment management system of the present embodiment will now be described. As depicted in FIG. 1, the electrical equipment management system is for managing the operation of electrical equipments in building 1 occupied by a plurality of tenants 2A and 2B. The building 1 has a plurality of sections which are occupied by the tenants 2A and 2B, respectively.

The section occupied by the tenant 2A accommodates a plurality of air conditioners 10A to 10G (electrical equipment), a compressor unit 20A (electrical equipment), a communication adaptor 30A, and a plurality of fluorescent lamp units 40A to 40C (electrical equipment). Likewise, the section occupied by the tenant 2B accommodates a plurality of air conditioners 10H to 10N, a compressor unit 20B, a communication adaptor 30B, and a plurality of fluorescent lamp units 40D to 40F. The building 1 is provided with a lighting interface 50 capable of separately communicating with each of the plurality of fluorescent lamp units 40A to 40F, and an RS panel 60 (control panel, total electrical energy information output unit) that outputs the amount of total electrical energy consumed by the tenants 2A and 2B altogether.

A host computer 100 (total electrical energy information acquiring unit, individual electrical energy acquiring unit, control information output unit) is communicatively connected to each of the air conditioners 10A to 10N and the compressor units 20A and 20B, separately, via the communication adaptors 30A and 30B. The host computer 100 is also communicatively connected to each of the fluorescent lamp units 40A to 40F via the lighting interface 50.

<Host Computer 100>

Figures 2A, 2B:
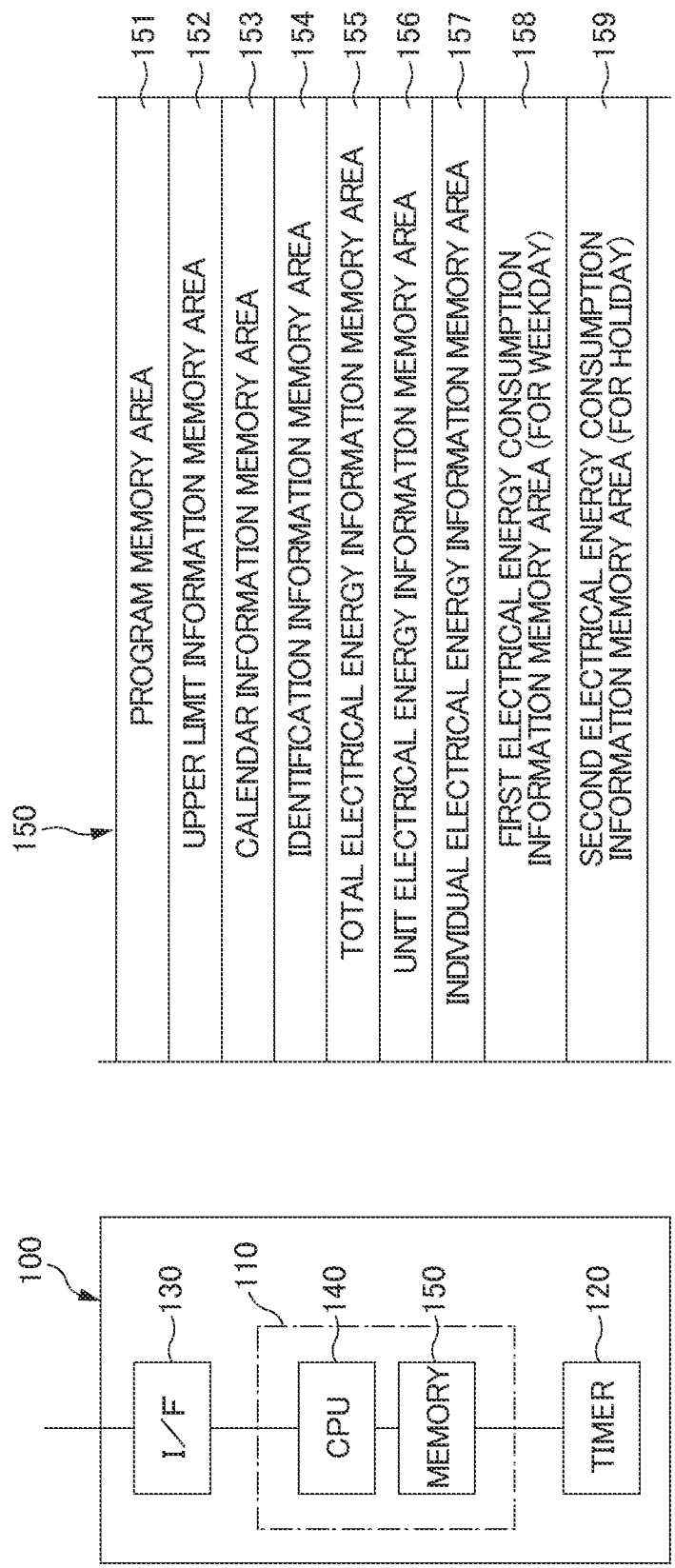
FIG. 2A is a block diagram of a configuration of a host computer in the electrical equipment management system of the present embodiment.
FIG. 2B is an explanatory diagram of memory areas provided to a memory in the host computer.

As depicted in FIG. 2A, the host computer 100 includes a control unit 110, a timer 120, and a communication interface 130.

The control unit 110 has a CPU 140 and a memory 150, and the CPU 140 executes programs stored in the memory 150 to implement various control operations. The timer 120 outputs time information necessary for control. The communication interface 130 controls communication by the host computer 100.

As depicted in FIG. 2B, the memory 150 spares part of its area for use as a program memory area 151, an upper limit information memory area 152, a calendar information memory area 153, an identification information memory area 154, a total electrical energy information memory area 155, a per unit electrical energy information memory area 156, an individual electrical energy information memory area 157, a first electrical energy consumption information memory area 158, and a second electrical energy consumption information memory area 159.

The program memory area 151 stores a program that is read out and executed by the CPU 140.

The upper limit information memory area 152 stores therein the upper limit of electrical energy consumption per month (predetermined period) for each tenant. In the case of FIG. 1, the upper limit information memory area 152 stores the maximum amount of electrical energy consumption permitted in a month for each of the tenants 2A and 2B. This upper limit may be set based on the contents of the contracts made with the tenants 2A and 2B, or may be set with a target value of electrical energy consumption for conserving energy. A target for energy conservation may be determined for each tenant and set the target value as an initial value. Consequently, the target for energy conservation is a target upper limit for controlling electrical energy consumption below the target upper limit. The host computer 100 is capable of setting this target upper limit separately for each tenant. In other words, the host computer 100 has a target upper limit setting means.

The calendar information memory area 153 stores therein monthly calendar information of each of the tenants 2A and 2B. For example, the calendar information memory area 153 stores information indicative of business days and holidays of the tenant 2A and the same of the tenant 2B on a monthly basis.

The identification information memory area 154 stores therein identification information for identifying electrical equipment communicative with the host computer 100. For example, the identification information memory area 154 stores unique identification information presented by each of the air conditioners 10A to 10N, the compressor units 20A and 20B, the fluorescent lamp units 40A to 40F, and the RS panel 60. The host computer 100 is, therefore, able to recognize from which electrical equipment a received information is transmitted from by checking the identification information included in the received information against identification information stored in the identification information memory area 154.

The total electrical energy information memory area 155 stores therein total electrical energy information (first total electrical energy volume information) indicative of the total electrical energy consumed by tenants 2A and 2B altogether. This total electrical energy information is acquired based on information of electrical energy consumption transmitted from the RS panel 60 (second total electrical energy information). For example, the total electrical energy information is acquired by sequentially summing up the electrical energy consumed during the 10 minutes of interval at which the information is transmitted from the RS panel.

The unit electrical energy information memory area 156 stores therein unit electrical energy information indicative of electrical energy consumed per unit time (unit electrical energy) by each electrical equipment. In this embodiment, the unit electrical energy information memory area 156 stores information indicative of unit electrical energy of each of the air conditioners 10A to 10N and the fluorescent lamp units 40A to 40F, associated with the identification information identifying each apparatus.

The individual electrical energy information memory area 157 stores therein individual electrical energy information indicative of individual electrical energy that is the summation of electrical energy consumed every 10 minutes by each of the tenants 2A and 2B from the first day of a predetermined period. This individual electrical energy is calculated by proportionally dividing the total electrical energy based on the total electrical energy information by a use ratio of specific electrical equipment disposed to each tenant. In this embodiment, firstly, operating time information sent from each of the air conditioners 10A to 10N is multiplied by corresponding unit electrical energy information to calculate electrical energy consumed by each of the air conditioners 10A to 10N. The calculated electrical energy consumptions are then summed up for each tenant to calculate electrical energy consumption by each of the tenants 2A and 2B. The total electrical energy is then divided proportionally by the electrical energy consumption by each of the tenants 2A and 2B to calculate the individual electrical energy.

The first electrical energy consumption information memory area 158 stores therein first electrical energy consumption information indicative of electrical energy consumption per unit period on a weekday for each of the tenants 2A and 2B. The first electrical energy consumption information in this embodiment is the information indicative of electrical energy consumed in a day by each of the tenants 2A and 2B. This first electrical energy consumption information is calculated from the individual electrical energy based on the individual electrical energy information. For example, the first electrical energy consumption information is calculated by extracting the individual electrical energy information on a weekday by referring to the calendar information and converting the individual electrical energy information for a period extracted into e electrical energy per day.

The second electrical energy consumption information memory area 159 stores therein second electrical energy consumption information indicative of electrical energy consumption per unit period on a holiday for each of the tenants 2A and 2B. The second electrical energy consumption information in this embodiment is information indicative of electrical energy consumption on a holiday by each tenant. This second electrical energy consumption information is also calculated from the individual electrical energy volume in the same manner the first electrical energy consumption information is calculated.

These first electrical energy consumption information and second electrical energy consumption information are generated along with operation of the system and therefore necessary information is not yet ready immediately after starting the system operation.

For this reason, the system is operated using an initial value (standard value) stored in advance, during a period following the start of the system, and then the initial value is altered based on the acquired information.

<Air Conditioner 10>

Figures 3A, 3B:
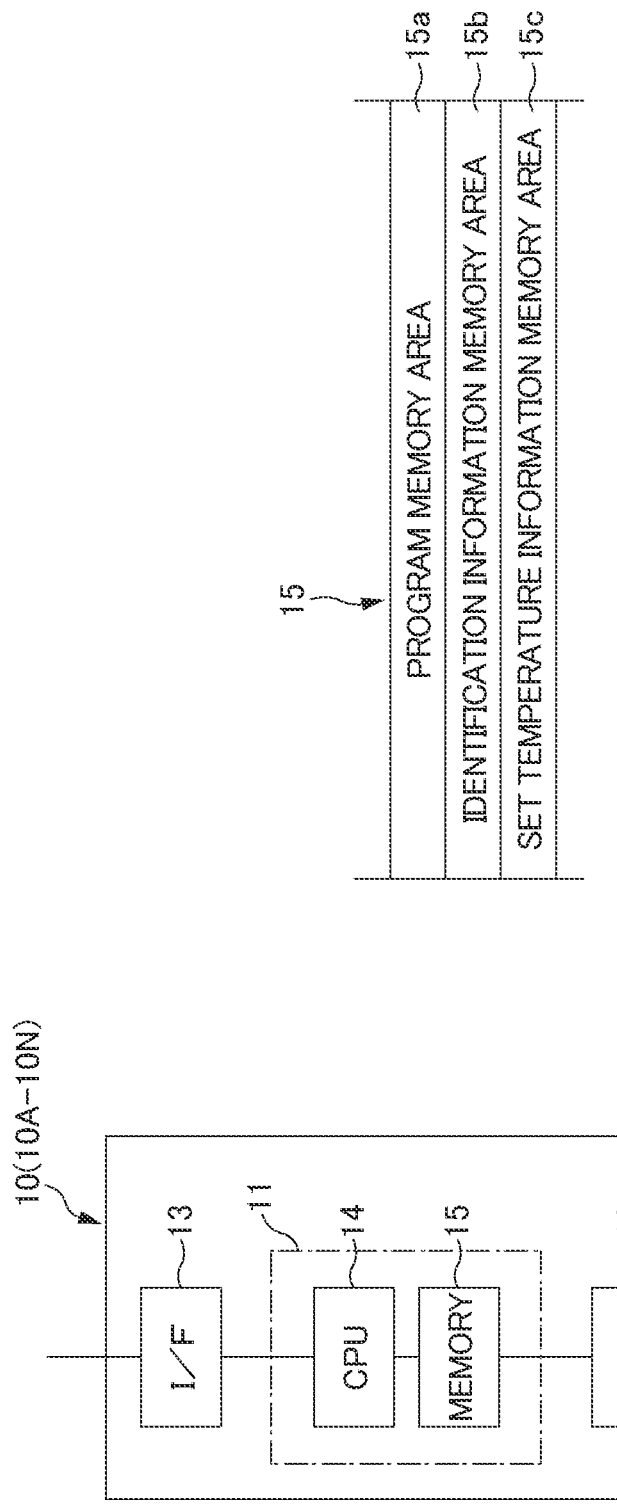
FIG. 3A is a block diagram of a configuration of a management system provided to an air conditioner in the electrical equipment management system of the embodiment.
FIG. 3B is an explanatory diagram of memory areas provided to a memory of the control system.

As depicted in FIG. 3A, the air conditioner 10 (10A to 10N) includes a control unit 11, a timer 12, and a communication interface 13.

The control unit 11 is the unit that executes various control operations, having a CPU 14 and a memory 15. The timer 12 outputs time information necessary for control. The communication interface 13 controls communication by the air conditioner 10.

As depicted in FIG. 3B, the memory 15 spares a part of its area for use as a program memory area 15a, an identification information memory area 15b, and a set temperature information memory area 15c.

The program memory area 15a stores therein a program that is read out and executed by the CPU 14.

The identification information memory area 15b stores therein unique identification information identifying the air conditioner 10 to which the identification information memory area 15b belongs. This identification information is used when the air conditioner 10 transmits/receives information. For example, when the air conditioner 10 transmits operating time information indicative of an operating time of the air conditioner 10, the air conditioner 10 adds the identification information to the information to be transmitted. The operating time information is acquired by the control unit 11 based on the time information from the timer. Hence the host computer 100 is able to recognize from which air conditioner among the air conditioners 10A to 10N the received operating time information is transmitted.

When receiving temperature control information for altering a set temperature, the air conditioner 10 receives the temperature control information including identification information corresponding to the air conditioner 10. This allows the air conditioner 10 to select and receive the corresponding temperature control information to be received upon receiving the temperature control information.

The set temperature information memory area 15c stores therein set temperature information indicative of a temperature set for the air conditioner 10. The control unit 11 checks the set temperature information to recognize the set temperature and controls a cooling mechanism (not shown) incorporated in the air conditioner 10. Therefore, a degree of cooling by the air conditioner 10 can be controlled by rewriting the contents of the set temperature information.

<Fluorescent Lamp Unit 40>

As depicted in FIG. 4A, the fluorescent lamp unit 40 (40A to 40F) includes therein a control unit 41 and a communication interface 42.

The control unit 41 is the unit that carries out various control operations, and includes a CPU 43 and a memory 44. The communication interface 42 controls communication by the fluorescent lamp unit 40.

As depicted in FIG. 4B, the memory 44 spares part of its area for use as a program memory area 44a, an identification information memory area 44b, and an illuminance information memory area 44c.

The program memory area 44a stores therein a program that is read out and executed by the CPU 43.

The identification information memory area 44b stores therein unique identification information identifying the fluorescent lamp unit, to which identification information memory area 44b belongs, among the fluorescent lamp units 40A to 40F. This identification information is used when the fluorescent lamp unit 40 transmits/receives information. For example, when receiving illuminance control information for altering the illuminance of the fluorescent lamp unit 40, the fluorescent lamp unit 40 receives illuminance control information including the identification information corresponding to the fluorescent lamp unit 40. This allows the fluorescent lamp unit 40 to select and receive the necessary illuminance control information upon receiving illuminance control information.

When the fluorescent lamp unit 40 transmits operating time information indicative of an operating time of the fluorescent lamp unit 40, the fluorescent lamp unit 40 adds identification information to the information to be transmitted in the same manner as the air conditioner 10 does.

The illuminance information memory area 44c stores illuminance information indicative of the illuminance of the fluorescent lamp unit 40. The control unit 41 checks the illuminance information to recognize an illuminance set value, and controls the fluorescent lamp unit. Therefore, the illuminance of the fluorescent lamp unit can be altered by rewriting the contents of the illuminance information.

<Operation of System>

Figure 5:
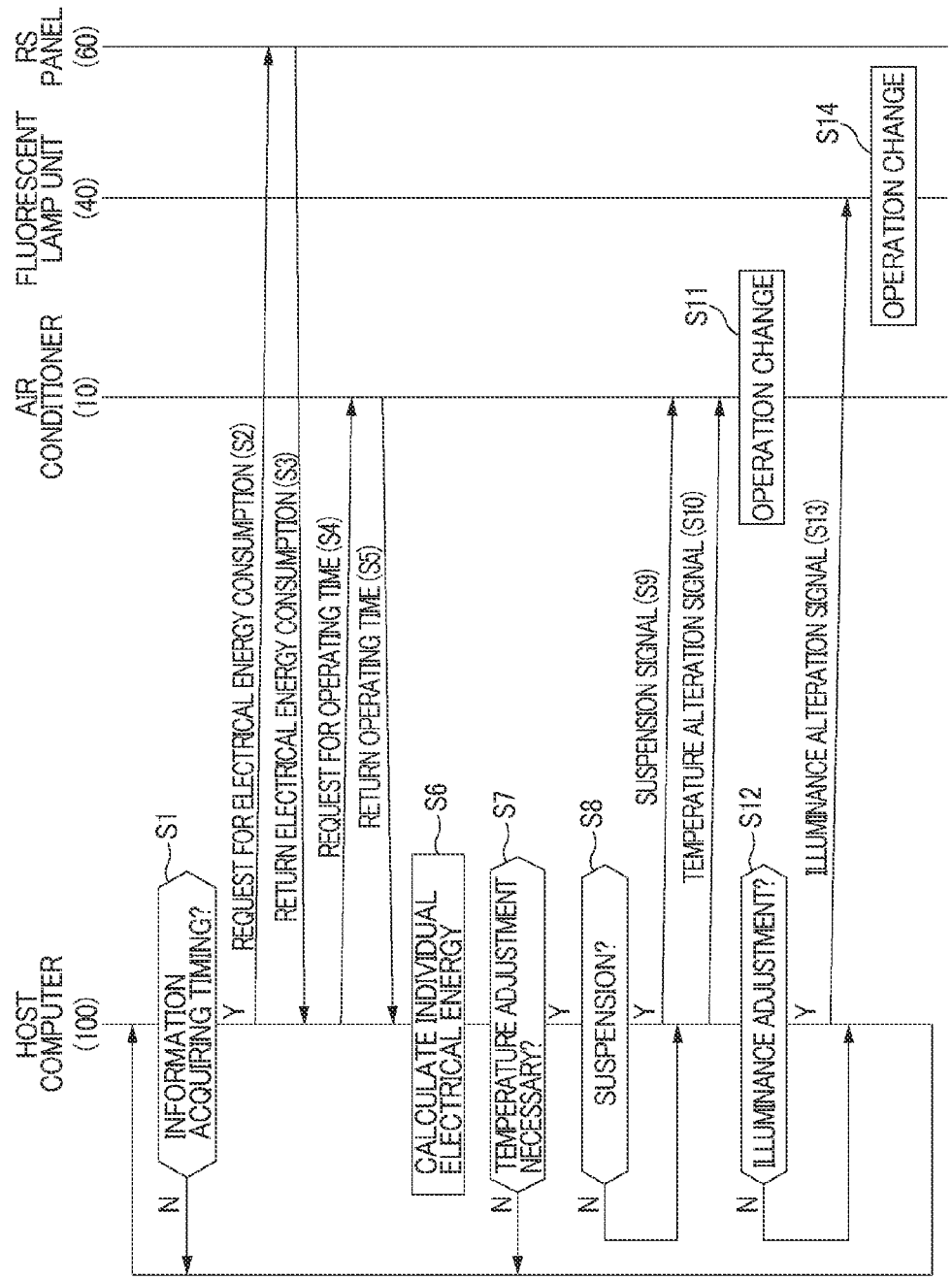
FIG. 5 is a flowchart for explaining an operation of the electrical equipment management system according to the present embodiment.

An operation of the electrical equipment management system will be described. According to this system, the host computer 100 determines whether information acquiring timing has arrived or not (S1) as depicted in FIG. 5. For example, based on time information from the timer 120, the host computer 100 determines whether or not 10 minutes (predetermined period) has elapsed from the operation start timing or the previous information acquiring timing.

When determining that the information acquiring timing has arrived, the host computer 100 transmits a command to request information of electrical energy consumption, to the RS panel 60 (S2). Receiving this request, the RS panel 60 returns information of electrical energy consumed during 10 minutes to the RS panel (S3). Upon transmitting/receiving information, the RS panel 60 adds identification information to the returned information. The host computer 100 thus checks the stored identification information against the incoming identification information to recognize that the incoming information is information from the RS panel 60. The host computer 100 transmits a command to request operating time information, to each of the air conditioners 10A to 10N (S4). Upon receiving this request, each of the air conditioners 10A to 10N returns its operating time information to the host computer 100 (S5). In this case, the host computer 100 checks the stored identification information against the identification information included in the return information to recognize from which air conditioner among the air conditioners 10A to 10N the return information is transmitted.

After acquiring the operating time information from each of the air conditioners 10A to 10N, the host computer 100 calculates individual electrical energy for each of the tenants 2A and 2B (S6). As described above, the host computer 100 calculates the electrical energy consumed by each of the air conditioners 10A to 10N by multiplying the operating time information from each of the air conditioners 10A to 10N by the unit electrical energy information. The host computer 100 then sums up the calculated electrical energy consumed for each of the tenants 2A and 2B to calculate electrical energy consumed by each of the tenants 2A and 2B. And the acquired total electrical energy is divided based on the ratio of the electrical energy consumed by tenant 2A to that of tenant 2B to calculate the individual electrical energy of each of the tenants 2A and 2B. Then the individual electrical energy information indicative of the calculated individual electrical energy is stored in the memory area.

The host computer 100 then determines whether temperature adjustment on the air conditioners 10A to 10N is necessary (S7). This determination is carried out based on upper limit information, calendar information, individual electrical energy information, first electrical energy consumption information, and second electrical energy consumption information, and is made by predicting whether or not the individual electrical energy would exceed the upper limit of the electrical energy consumed at the time the last day of a predetermined period (one month) arrives, on the assumption that the current electrical energy consumption will continue. When the individual electrical energy is predicted to exceed the upper limit, the host computer 100 determines that temperature adjustment is necessary, and generates control information indicative of altered contents. When necessary, the host computer 100 also generates control information for altering the illuminance of the fluorescent lamp unit 40. Determination and the like on whether temperature adjustment is necessary or not will be described later.

When determining at step S7 that temperature adjustment is unnecessary, the host computer 100 repeats processes from step S1. When determining at step S7 that temperature adjustment is necessary, the host computer 100 determines whether or not to suspend the operation of at least one of the air conditioners 10A to 10N (S8), that is, determines whether or not control information indicative of suspension of air conditioner operation is generated at step S7. When the control information is generated, the control information is transmitted to the air conditioner 10 to be suspended (S9). At this time, the host computer 100 adds identification information identifying the air conditioners 10 to be suspended, to the information to be transmitted. This allows each of the air conditioners 10A to 10N to recognize whether or not it is the air conditioner to be suspended by checking its identification information against the incoming identification information.

When determining at step S8 that the suspension is unnecessary, the host computer 100 transmits control information for temperature alteration to at least one of the air conditioners 10A to 10N (S10). When the air conditioners 10A to 10N are on cooling operation, the contents of the control information is fixed to contents for raising a set temperature. In contrast, when the air conditioners 10A to 10N are on heating operation, the contents of the control information is fixed to contents for lowering the set temperature. Identification information is added to the information to be transmitted is the same as in the case of the control information for operation suspension.

Based on the control information for operation suspension or the control information for temperature alteration, the operation of any of the target air conditioners 10A to 10N is changed in accordance with the contents of the control information (S11), that is, its operation is suspended or its set temperature altered. When the set temperature is altered, set temperature information stored in the set temperature information memory area 15c is rewritten, as described above.

After transmitting the control information for operation suspension or temperature alteration, the host computer 100 determines whether or not to adjust the illuminance (S12), that is, determines whether or not control information indicative of illuminance alteration is generated at step S7. When the control information is generated, the host computer 100 transmits the control information for altering the illuminance to at least one of the fluorescent lamp units 40A to 40F (S13). Each of the fluorescent lamp units 40A to 40F receiving the control information then determines whether it is the fluorescent lamp unit whose illumination is to be altered. Then the target fluorescent lamp unit alters its illumination (S14), that is, rewrites the contents of the illumination information stored in the illumination information memory area 44c.

After determining that illuminance is not to be adjusted or after transmitting the control information indicative of illuminance alteration, the host computer 100 returns to step S1 to carry out processes following step S1.

<Determination on Whether Temperature Adjustment is Necessary>

Figure 6:
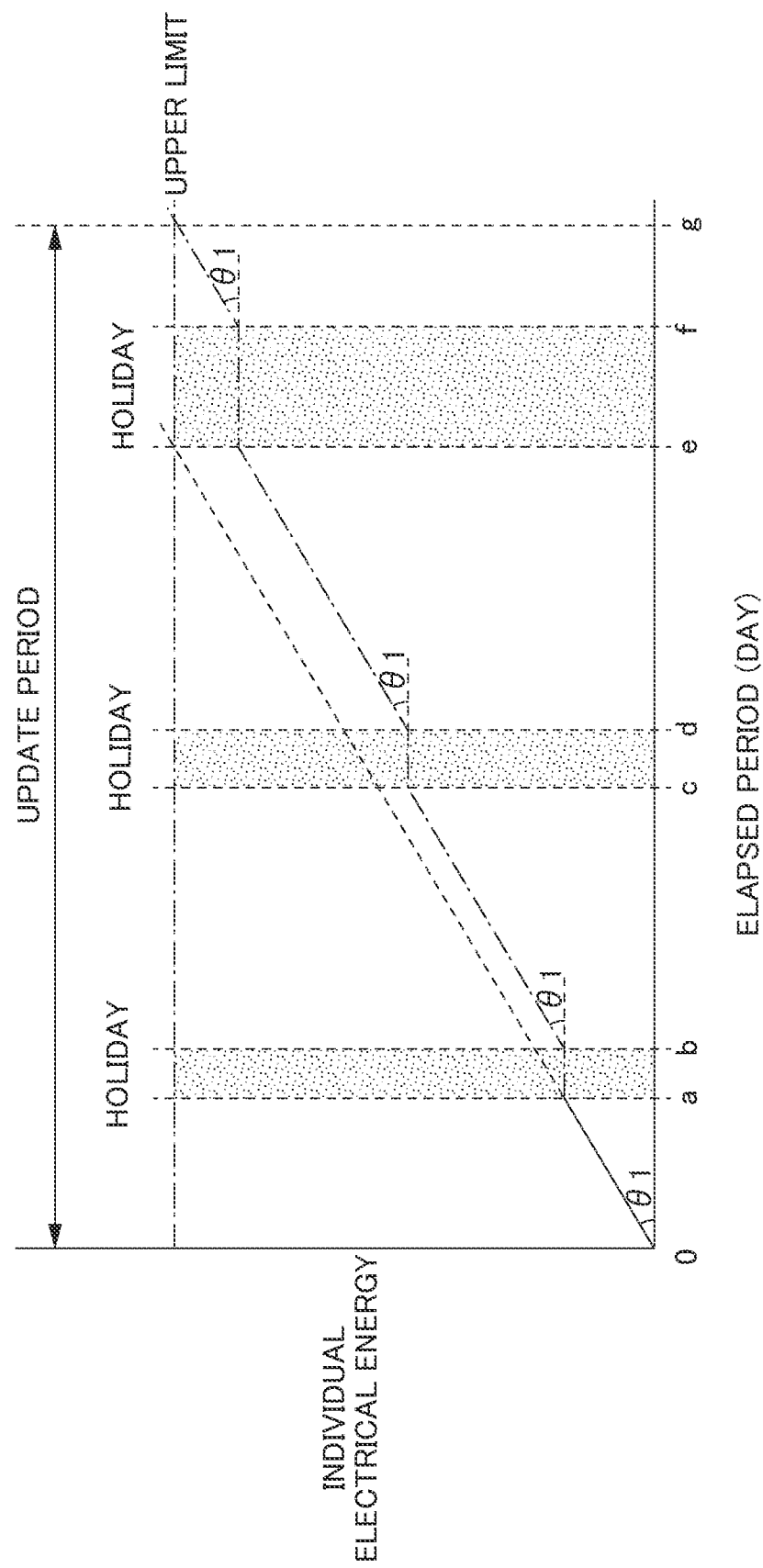
FIG. 6 is an explanatory diagram of a process of determining whether alteration is necessary, depicting the process in a case alteration is determined to be unnecessary by taking holidays into consideration.

Determination on whether temperature adjustment is necessary and the contents of control information will be described. FIG. 6 diagrammatically depicts a case where temperature adjustment is unnecessary because electrical energy consumption on holidays is taken into consideration. In FIG. 6, the vertical axis represents electrical energy consumption by a single tenant 2, that is, the individual electrical energy of the tenant 2. The electrical energy indicated by alternate long and short dashed lines on the vertical axis is a target upper limit of electrical energy consumption by the tenant 2. The horizontal axis represents the elapsed period in a month (update period) that is plotted in days. On the horizontal axis, the a-b, c-d, and e-f periods indicate holidays. The relation between the vertical axis and the horizontal axis in FIGS. 7 and 8 is the same as that in FIG. 6.

In the case of FIG. 6, the first electrical energy consumption (individual electrical energy per weekday) at the point a days have elapsed is set to a value denoted by $\theta 1$, and the second electrical energy consumption (individual electrical energy per a holiday) is set to an initial value of approximately 0. The host computer 100 thus predicts the individual electrical energy during the a-g period, which is the remaining period, under the condition that the first electrical energy consumption takes the value of $\theta 1$ and the second electrical energy consumption is approximately 0. This means calculation of the individual electrical energy at day g on the assumption that the individual electrical energy increases by $\theta 1$ on a weekday and that the electrical energy consumption is approximately 0 on holidays.

In this case, because the individual electrical energy at day g is slightly below the target upper limit, the host computer 100 determines that neither temperature adjustment to the air conditioners 10A to 10N nor illuminance adjustment on the fluorescent lamp units 40 is necessary. The host computer 100 thus determines at step S7 of FIG. 5 that temperature adjustment is unnecessary, and proceeds to step S1.

Figure 7:
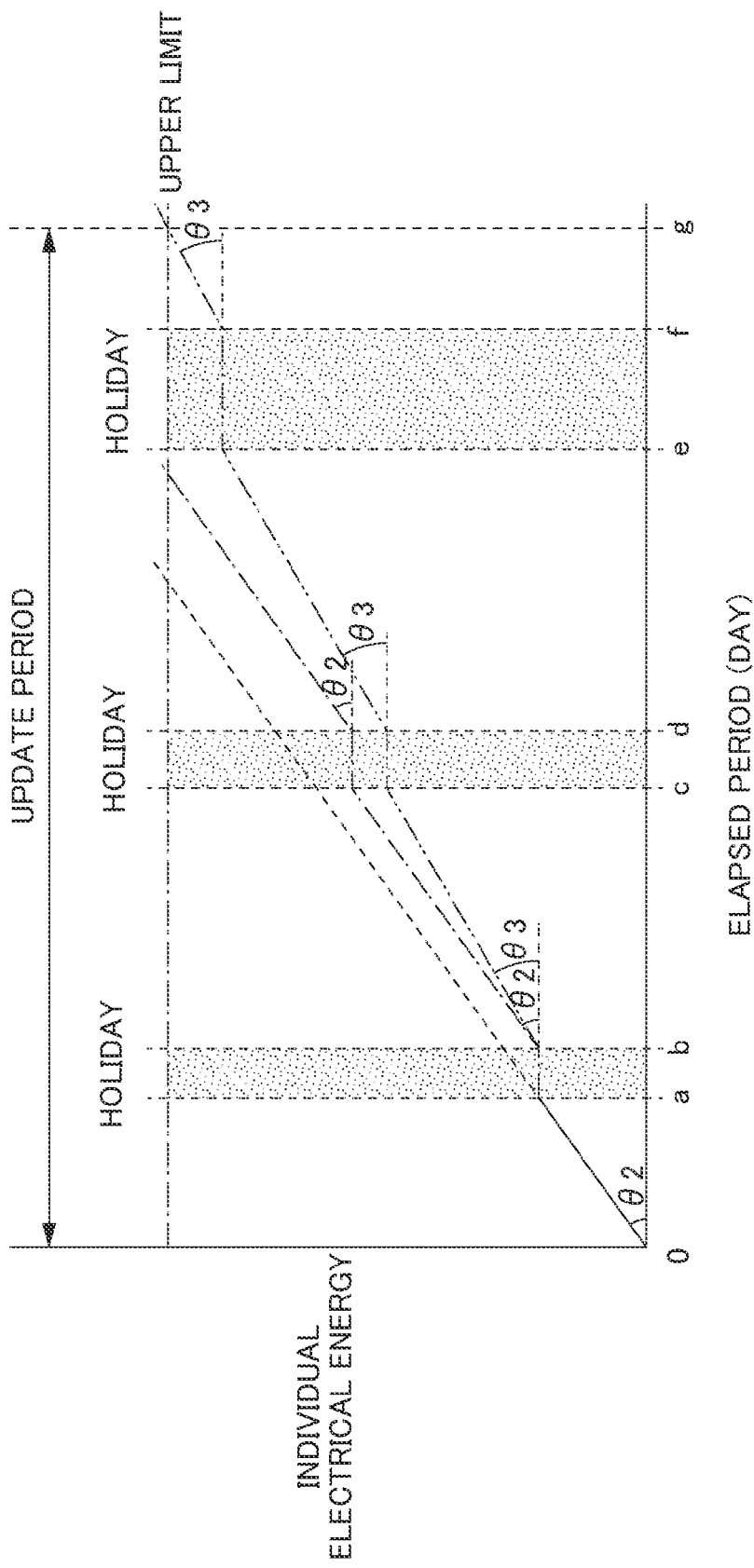
FIG. 7 is an explanatory diagram of a process of determining whether alteration is necessary, depicting the process in a case alteration is determined be necessary in spite of taking holidays into consideration.
Figure 8:
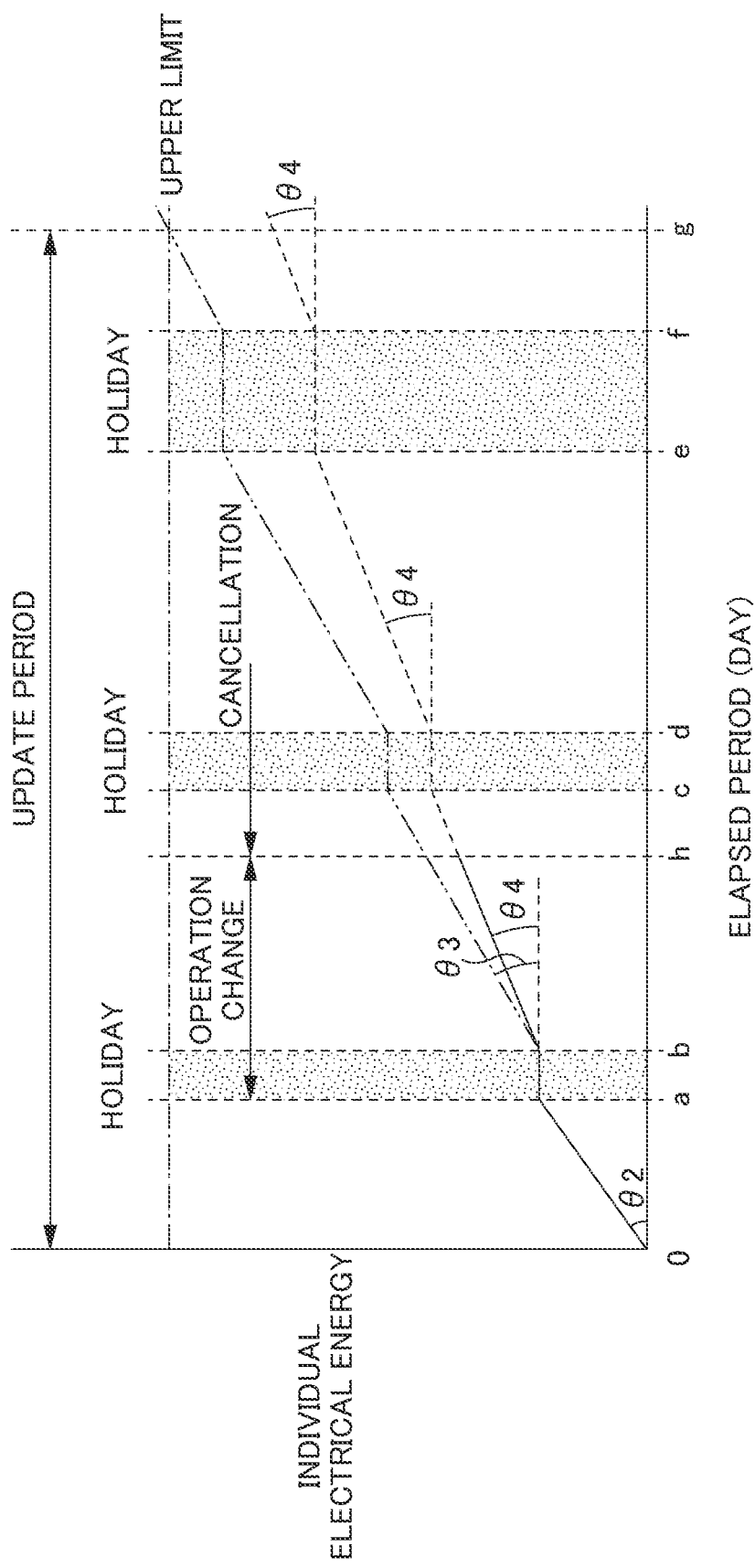
FIG. 8 is an explanatory diagram of a process of determining whether alteration is necessary, depicting the process in the case of cancelling a set alteration process.

FIG. 7 diagrammatically depicts a case where temperature adjustment is necessary in spite of taking into consideration electrical energy consumption on holidays. In the case of FIG.

7, the first electrical energy consumption at the point a days have elapsed is set to a value θ2, which is larger than the value θ1, and the second electrical energy consumption is also set to approximately 0. The host computer 100 thus predicts the individual electrical energy for the remaining period under the condition that the first electrical energy consumption takes the value of θ2 and the second electrical energy consumption is approximately 0. This estimation brings a conclusion that the individual electrical energy exceeds the target upper limit just before day e. To suppress electrical energy consumption, therefore, the host computer 100 determines that there is a need to control, for example, raise the set temperature for the air conditioners 10A to 10N, when under cooling operation. The host computer 100 thus calculates the value θ3 for the first electrical energy consumption so that the individual electrical energy consumption is slightly below the upper limit at day g, and determines the temperature set for the air conditioners 10A to 10N so that the individual electrical energy consumption takes the value of θ3. Hence the host computer 100 generates control information for altering the temperature set for the air conditioners 10A to 10N. If this temperature adjustment does not help achieve sufficient reduction in electrical energy consumption, the host computer 100 further generates control information for suspending some of the air conditioners 10A to 10N. This control information is transmitted to the air conditioners 10A to 10N as a target of suspension at step S10 of FIG. 5.

FIG. 8 diagrammatically depicts a case where temperature adjustment, i.e., output adjustment is carried out on the air conditioners 10A to 10N as in the case of FIG. 7, and then this adjustment is cancelled. In the case of FIG. 8, the host computer 100 determines that the first electrical energy consumption takes a value θ4 smaller than the value θ3 at a point when h days have elapsed. The host computer 100 then calculates the individual electrical energy volume for the remaining h-g period using the value θ4. In this case, the individual electrical energy at a point g days have elapsed is sufficiently smaller than the target upper limit. As a result, the host computer 100 determines that altering the temperature set for the air conditioners 10A to 10N is unnecessary, thus cancels the previous setting for temperature adjustment. This means that the host computer 100 generates control information for cancelling to turn the set temperature back to the original set temperature. This control information is transmitted at step S10 of FIG. 5 to the air conditioners 10A to 10N as target. As a result, any one of the air conditioners 10A to 10N as target operates under the original set temperature.

According to the present embodiment, electrical energy consumption in each section is acquired depending on a total electrical energy, and the electrical energy consumption of the electrical equipments disposed in each section are controlled, according to the electrical energy consumption, the upper limit of the electrical energy consumption in each section, and a remaining period before a lapse of a predetermined period, so that electrical energy consumption does not exceed the upper limit of the electrical energy consumption. In this manner, the electrical equipment in each section is controlled so that their electrical energy consumption does not exceed the upper limit of the electrical energy consumption.

Other Embodiment

The above embodiments of the present invention are simply for facilitating the understanding of the present invention and are not in any way to be construed as limiting the present invention. The present invention may variously be changed or altered without departing from its spirit and encompass equivalents thereof.

While building 1 has been exemplified in the above-described embodiment, buildings other than building 1 are applicable as long as the building has a plurality of sections.

In the above embodiment, operating time has been multiplied by an hourly electrical energy consumption taking into consideration differences in electrical energy consumption among electrical apparatuses when acquiring the individual electrical energy volume. However, the present invention is not limited to the above. If electrical energy consumed by each of the electrical equipments is substantially the same, the individual electrical energy for each tenant 2 may be acquired by dividing the total electrical energy by an operating time ratio.

In the above-described embodiment, the air conditioner 10 that consumes greater electrical energy per unit time and operates for a longer time was determined to be electrical equipment to be controlled. However, electrical equipment other than the air conditioner 10, may be the target electrical equipment to be controlled. For example, a heater operated in winter may be the target electrical equipment to be controlled.

Regarding the period of management (predetermined period), while management was performed on a monthly basis in the above embodiment, management can be carried out on a weekly basis or a daily basis. In other words, the predetermined period can be any one of a month, a week, or a day. When holidays are taken into consideration, the predetermined period is a month or a week. In a case of daily management, non-business hours may be used in place of a holiday.

What is claimed is:

1. An electrical equipment management system comprising:
    a total electrical energy information acquiring unit disposed in a building having a plurality of sections, the total electrical energy information acquiring unit configured to acquire total electrical energy information indicative of a total electrical energy consumed in a whole of the plurality of sections;
    an individual electrical energy acquiring unit configured to acquire individual electrical energy information indicative of electrical energy consumption in each section depending on the total electrical energy;
    a control information output unit configured to output control information for controlling operation of electrical equipment disposed in the section so that a cumulative electrical energy consumption for a particular section of the plurality of sections after a predetermined period has elapsed does not exceed an upper limit of cumulative electrical energy consumption for the particular section for the predetermined period, in accordance with a difference between the individual electrical energy information and the upper limit as well as a remaining period information indicative of a remaining period before a lapse of the predetermined period; and
    an operating time information acquiring unit configured to acquire operating time information indicative of an operating time of the electrical equipment,
    wherein the individual electrical energy acquiring unit acquires the individual electrical energy information by multiplying the operating time information by unit electrical energy information indicative of electrical energy consumed by the electrical equipment per unit time.

2. The electrical equipment management system of claim 1, wherein
the control information output unit sets a difference for determining output of the control information between the upper limit information and the individual electrical energy information at being smaller than a difference set in a case where a remaining period does not include a holiday,
in a case where the remaining period defined by the remaining period information includes the holiday of a tenant occupying the section.

3. The electrical equipment management system of claim 1, wherein
the electrical equipment includes an air conditioner, and wherein
the control information output unit outputs control information for altering a set temperature for the air conditioner.

4. The electrical equipment management system of claim 1, wherein
the electrical equipment includes a luminaire, and wherein
the control information output unit outputs control information for altering illuminance of the luminaire.

5. The electrical equipment management system of claim 1, further comprising:
an upper limit information memory unit configured to store the upper limit information; and
a setting unit configured to set the upper limit information.

* * * * *